United States Patent
Yoshitsugu (10) Patent No.: US 7,443,605 B2
(45) Date of Patent: Oct. 28, 2008

(54) ZOOM LENS, IMAGING DEVICE, AND CAMERA HAVING IMAGING DEVICE

(75) Inventor: Keiki Yoshitsugu, Sakai (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 28 days.

(21) Appl. No.: 10/533,312

(22) PCT Filed: Jun. 3, 2004

(86) PCT No.: PCT/JP2004/008058

§ 371 (c)(1),
(2), (4) Date: Apr. 25, 2006

(87) PCT Pub. No.: WO2004/111698

PCT Pub. Date: Dec. 23, 2004

(65) Prior Publication Data

US 2006/0193061 A1 Aug. 31, 2006

(30) Foreign Application Priority Data

Jun. 13, 2003 (JP) .............................. 2003-169069

(51) Int. Cl.
*G02B 15/14* (2006.01)
(52) U.S. Cl. ..................................... 359/687
(58) Field of Classification Search ................. 359/676, 359/686, 687
See application file for complete search history.

(56) References Cited

U.S. PATENT DOCUMENTS

| 6,606,202 | B2 | 8/2003 | Hoshi |
| 6,633,437 | B1 | 10/2003 | Hoshi et al. |
| 6,650,475 | B1 | 11/2003 | Hamano |
| 6,751,030 | B2 | 6/2004 | Saruwatari |
| 2002/0089762 | A1 | 7/2002 | Hoshi |
| 2003/0227691 | A1 | 12/2003 | Saruwatari |
| 2004/0056969 | A1 | 3/2004 | Hamano et al. |

FOREIGN PATENT DOCUMENTS

| JP | 2000-347102 | 12/2000 |
| JP | 2001-13411 | 1/2001 |
| JP | 2001-42215 | 2/2001 |
| JP | 2001-117000 | 4/2001 |

(Continued)

*Primary Examiner*—Darryl J Collins
(74) *Attorney, Agent, or Firm*—McDermott Will & Emery LLP (57) ABSTRACT

A zoom lens has a field view of 60° to 70° at a wide-angle end, a magnification change ratio of about five to six times, and a small number of component lenses, enables retraction to a compact size when not in use, provides high resolution, and is compatible with a compensation function for zoom lens vibrations. Comprised are, in order from an object side, a first lens unit (G1) of positive optical power, a second lens unit (G2) of negative optical power, a third lens unit (G3) of positive optical power, and a fourth lens unit (G4) of positive optical power. When zooming from the wide-angle end to a telephoto end, the first lens unit (G1) and the second lens unit (G2) move so as to trace a convex path toward an image side, and the third lens unit and the fourth lens unit (G4) move monotonously toward an object side.

21 Claims, 10 Drawing Sheets

FOREIGN PATENT DOCUMENTS

| | | |
|---|---|---|
| JP | 2001-188170 | 7/2001 |
| JP | 2002-14284 | 1/2002 |
| JP | 2002-72087 | 3/2002 |
| JP | 2002-107622 | 4/2002 |
| JP | 2002-196241 | 7/2002 |
| JP | 2003-43356 | 2/2003 |
| JP | 2003-207715 | 7/2003 |
| JP | 2004-12638 | 1/2004 |
| JP | 2004-109653 | 4/2004 |
| JP | 2004-199000 | 7/2004 |

ZOOM LENS, IMAGING DEVICE, AND CAMERA HAVING IMAGING DEVICE

TECHNICAL FIELD

The present invention relates to a high image quality zoom lens and optical devices having the same, in particular, digital still cameras, digital video cameras.

BACKGROUND ART

Conventionally, there are a number of types of, for example, digital still cameras, and one of the types is a compact type for which a zoom lens with higher magnification power and higher imaging ability is sought.

There are a number of three-unit zoom lenses that have been proposed as zoom lenses suitable for the compact type, and the three-unit zoom lenses includes, in order from an object side, a first lens unit having negative optical power, a second lens unit having positive optical power, and a third lens unit having positive optical power. For a magnification change ratio of up to three times, these three-unit zoom lenses can be configured to be compact and have a wide field view at a wide-angle end. However, it is not possible to obtain a high magnification power zoom lens because an F-number at a telephoto end is large compared with an F-number at the wide-angle end.

As zoom lenses which ensure relatively high magnification power without the F-Number at the telephoto end being significantly large compared with the F-number at the wide-angle end, there have been proposed a number of four-unit zoom lenses, as described in, for example, Japanese Laid-Open Patent Publication Nos. 2001-13411, 2001-42215, 2002-72087, and 2002-196241, including, in order from an object side, a first lens unit having a positive refractive optical power, a second lens unit having a negative refractive optical power, a third lens unit having a positive refractive optical power, and a fourth lens unit having a positive refractive optical power.

DISCLOSURE OF THE INVENTION

Although the zoom lens described in Japanese Laid-Open Patent Publication No. 2001-13411 allows a magnification change ratio of about six times, it includes a large number of component lenses, and therefore it is difficult to retract them to a compact size when not in use. Also, the zoom lens described in Japanese Laid-Open Patent Publication No. 2001-42215has only a small number of component lenses and therefore can be retracted to a compact size when not in use, but it allows only a low magnification change ratio of about three times. Also, the zoom lenses described in Japanese Laid-Open Patent Publication Nos. 2002-72087 and 2002-196241 allow only a low magnification change ratios of about three times.

The present invention aims to provide a zoom lens, which has a field view of 60° to 70° at a wide-angle end, a magnification change ratio of about five to six times, and a small number of component lenses, enables retraction to a compact size when not in use, provides high resolution, and is compatible with a compensation function for zoom lens vibrations, and to provide an imaging device such as a digital still camera, a video camera, etc., having the zoom lens.

The above object is achieved by the following zoom lens. A zoom lens comprises, in order from an object side, a first lens unit of positive optical power, a second lens unit of negative optical power, a third lens unit of positive optical power, and a fourth lens unit of positive optical power, and, when zooming from a wide-angle end to a telephoto end, the first lens unit and the second lens unit move so as to trace a convex path toward an image side, and the third lens unit and the fourth lens unit move monotonously toward an object side.

Preferably, a diaphragm is provided on an object side of the third lens unit.

Preferably, the first lens unit includes either a single positive lens element or a cemented lens including a set of a negative lens element and a positive lens element.

Preferably, when in a state of focusing at infinity, a focal length of an entire lens system at the wide-angle end is $f_W$, a focal length of the first lens unit is $f_{G1}$, and a magnification change ratio between the wide-angle end and the telephoto end is Z, the following conditional expression is satisfied, $$0.1 < f_W/f_{G1} < 0.3 \text{(where } Z > 4.5\text{)} \qquad (1).$$

Preferably, when in a state of focusing at infinity, a focal length of the entire lens system at the wide-angle end is $f_W$, a focal length of the fourth lens unit is $f_{G4}$, and a magnification change ratio between the wide-angle end and the telephoto end is Z, the following conditional expression is satisfied, $$0.25 < f_W/f_{G4} < 0.35 \text{(where } Z > 4.5\text{)} \qquad (2).$$

Preferably, when in a state of focusing at infinity, a magnification change ratio between the wide-angle end and the telephoto end is Z, a thickness of an i-th lens unit (where i is an integer) is $d_i$, and a total thickness of the lens units is $d_{si}$, the following conditional expression is satisfied, $$3 < d_{si}/Z < 5 \text{(where } Z > 4.5\text{)} \qquad (3).$$

Preferably, a single lens element of positive optical power in the fourth lens unit includes a bi-convex lens.

Preferably, a lens element closest to the object side in the third lens unit includes a lens of positive optical power, and an image-side surface of the lens is flat or concave.

Preferably, a cemented lens element is included in the third lens unit.

Preferably, the third lens unit is moved in a direction perpendicular to an optical axis to allow compensation for a movement of an image caused by a vibration of the zoom lens.

Further, the above object is achieved by the following imaging device. An imaging device capable of converting and outputting an optical image of a subject as an electrical image signal comprises a zoom lens for forming the optical image of the subject so as to be zoomable and an imaging element for converting the optical image of the subject formed by the zoom lens into an electrical signal, the zoom lens including, in order from an object side, a first lens unit of positive optical power, a second lens unit of negative optical power, a third lens unit of positive optical power, and a fourth lens unit of positive optical power, and, when zooming from a wide-angle end to a telephoto end, the first lens unit and the second lens unit move so as to trace a convex path toward an image side, and the third lens unit and the fourth lens unit move monotonously toward the object side.

Preferably, a diaphragm is provided on the object side of the third lens unit.

Preferably, the first lens unit includes either a single positive lens element or a cemented lens including a set of a negative lens element and a positive lens element.

Preferably, when in a state of focusing at infinity, a focal length of an entire lens system at the wide-angle end is $f_W$, a focal length of the first lens unit is $f_{G1}$, and a magnification change ratio between the wide-angle end and the telephoto end is Z, the following conditional expression is satisfied, $$0.1 < f_W/f_{G1} < 0.3 \text{where } Z > 4.5\text{)} \qquad (1).$$

Preferably, when in a state of focusing at infinity, a focal length of the entire lens system at the wide-angle end is $f_W$, a focal length of the fourth lens unit is $f_{G4}$, and a magnification change ratio between the wide-angle end and the telephoto end is Z, the following conditional expression is satisfied, $$0.25 < f_W/f_{G4} < 0.35 \text{ (where } Z > 4.5) \tag{2}$$

Preferably, when in a state of focusing at infinity, a magnification change ratio between the wide-angle end and the telephoto end is Z, a thickness of an i-th lens unit (where i is an integer) is $d_i$, and a total thickness of the lens units is $d_{si}$, the following conditional expression is satisfied, $$3 < d_{si}/Z < 5 \text{ (where } Z > 4.5) \tag{3}$$

Preferably, a single lens element of positive optical power in the fourth lens unit includes a bi-convex lens.

Preferably, a lens element closest to the object side in the third lens unit includes a lens of positive optical power, and an image-side surface of the lens is flat or concave.

Preferably, a cemented lens element is included in the third lens unit.

Preferably, third lens unit is moved in a direction perpendicular to an optical axis so as to allow compensation for a movement of an image caused by a vibration of the zoom lens.

The above object is achieved by the following camera. Preferably, a camera capable of capturing an image of a subject and outputting the image as an electrical image signal comprises an imaging device including a zoom lens for forming an optical image of the subject so as to be zoomable and an imaging element for converting the optical image of the subject formed by the zoom lens into the electrical signal, and the zoom lens including, in order from an object side, a first lens unit of positive optical power, a second lens unit of negative optical power, a third lens unit of positive optical power, and a fourth lens unit of positive optical power, and, when zooming from a wide-angle end to a telephoto end, the first lens unit and the second lens unit move so as to trace a convex path toward an image side, and the third lens unit and the fourth lens unit move monotonously toward an object side.

Preferably, the camera is a digital still camera capable of obtaining a still image of the subject.

Preferably, the camera is a digital video camera capable of obtaining a moving picture of the subject.

BEST MODE FOR CARRYING OUT THE INVENTION

Hereinafter, embodiments of the present invention will be described with reference to the drawings and tables.

Figure 1:
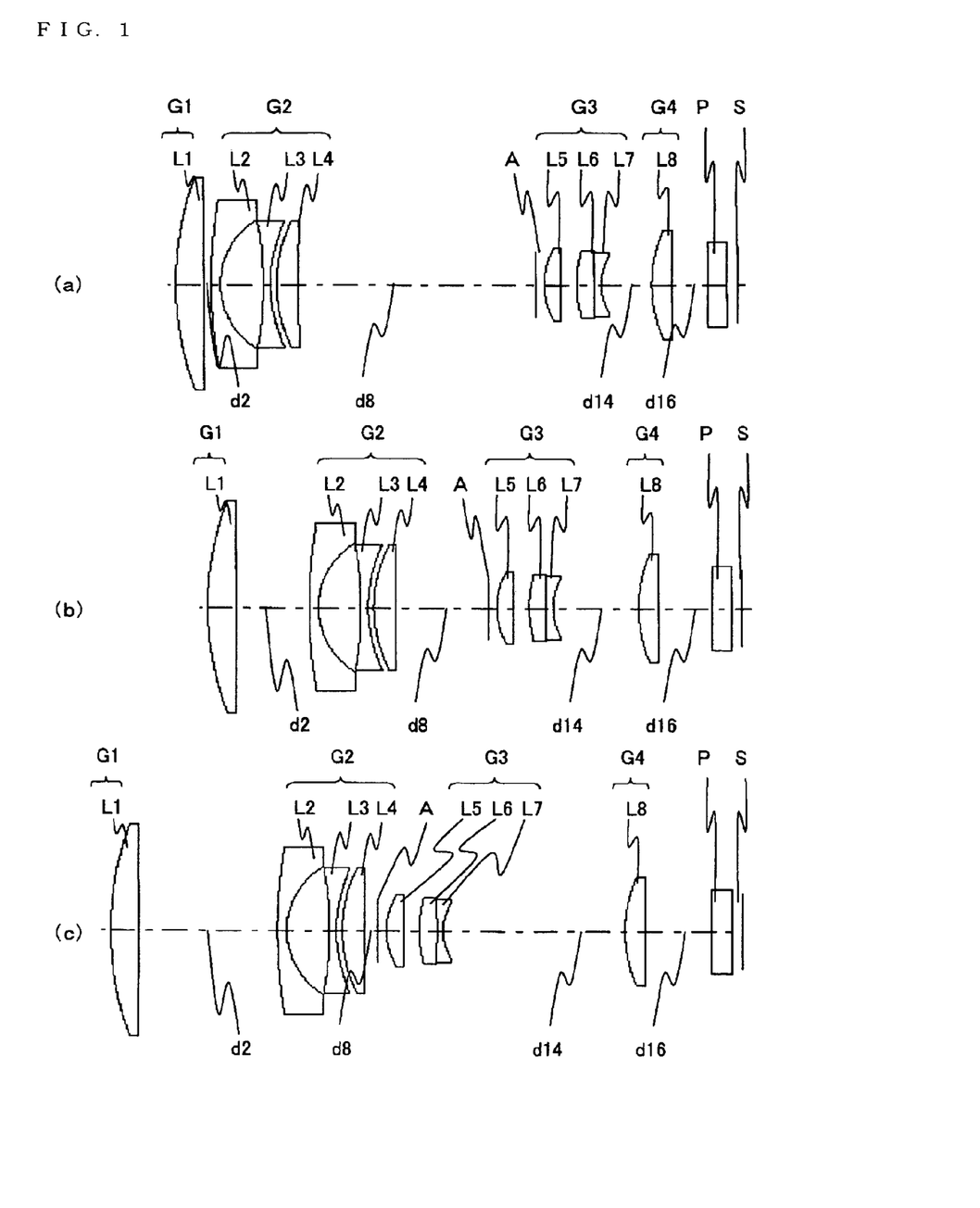
FIG. 1 is a configuration diagram of a zoom lens according to a first embodiment of the present invention.
Figure 3:
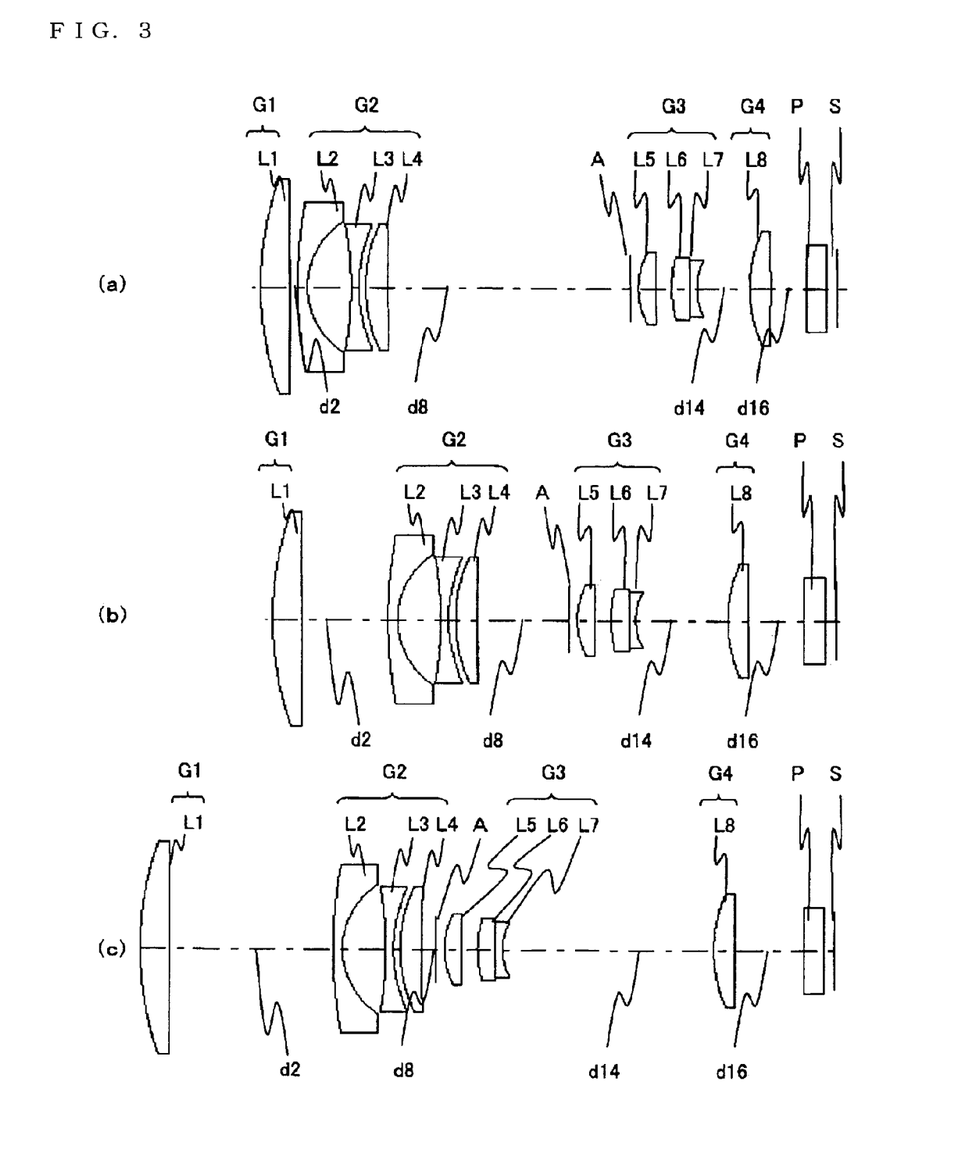
FIG. 3 is a configuration diagram of a zoom lens according to a second embodiment of the present invention.
Figure 5:
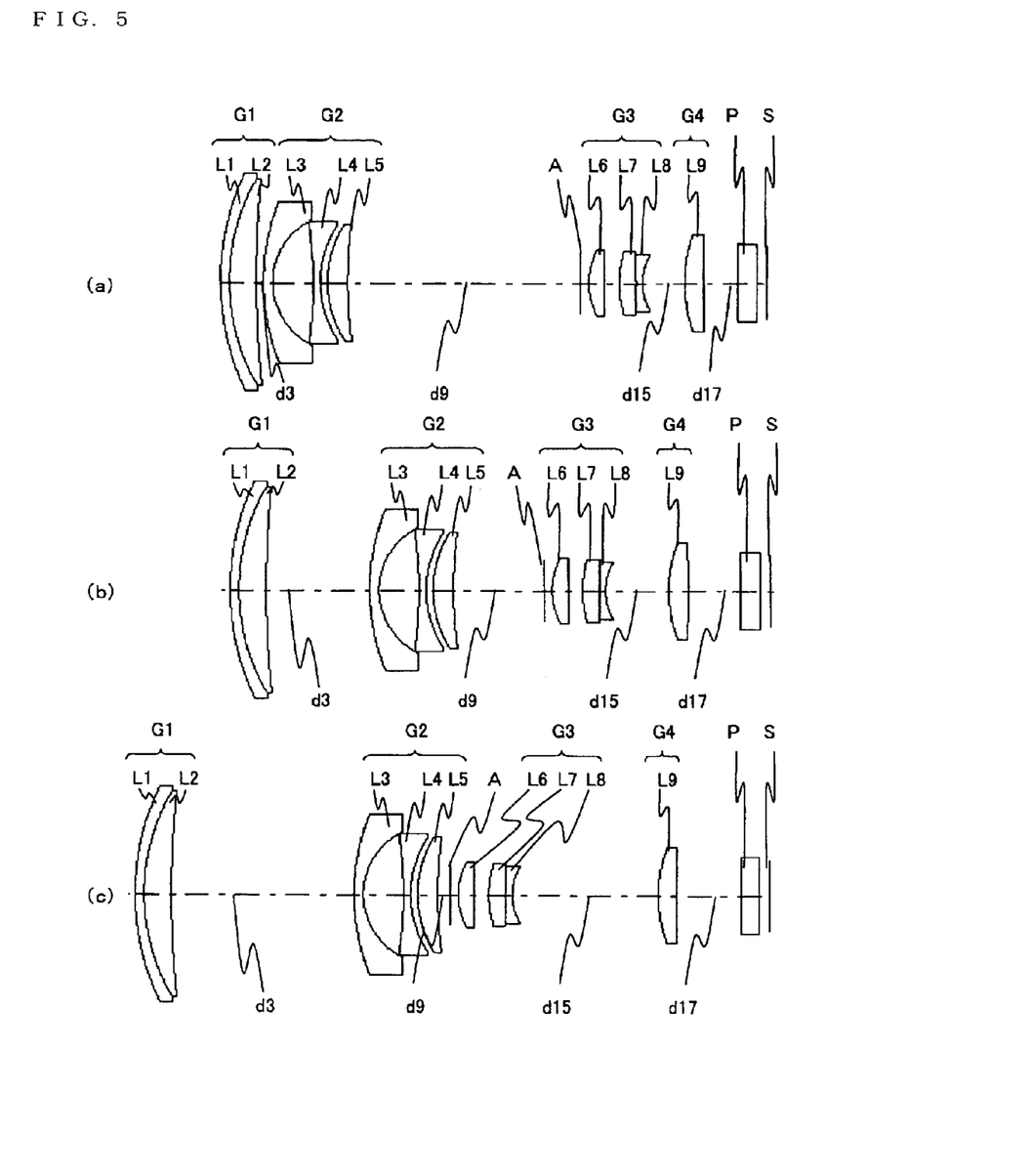
FIG. 5 is a configuration diagram of a zoom lens according to a third embodiment of the present invention.

FIG. 1 is a configuration diagram of a zoom lens according to a first embodiment of the present invention. FIG. 3 is a configuration diagram of a zoom lens according to a second embodiment of the present invention. FIG. 5 is a configuration diagram of a zoom lens according to a third embodiment of the present invention. Each of the diagrams depicts a zoom lens in a state of focusing at infinity.

In each diagram, (a) illustrates a lens configuration at a wide-angle end (shortest focal length state: focal length $f_W$), (b) illustrates a lens configuration at an intermediate position (intermediate focal length state: focal length $f_M = \sqrt{(f_W * f_T)}$), and (c) illustrates a lens configuration at a telephoto end (longest focal length state: focal length $f_T$).

The zoom lenses according to the embodiments each include, in order from an object side, a first lens unit G1 of positive optical power, a second lens unit G2 of negative optical power, a third lens unit G3 of positive optical power, and a fourth lens unit G4 of positive optical power. In the zoom lenses according to the embodiments, when zooming from a wide-angle end to a telephoto end, the first lens unit G1 and the second lens unit G2 are caused to perform U-turn tracing toward an image side so as to trace a convex path and enlarge the distance there between, whereas, the third lens unit G3 and the fourth lens unit G4 are caused to move together with a diaphragm A monotonously toward the object side.

Note that, in each diagram, straight lines shown on the most rigth side of the diagram indicate the position of an image plane S, and provided on the object side thereof is a flat plate P, which is equivalent to an optical low-pass filter, a face plate of an imaging element, or the like.

In the zoom lenses according to the embodiments, the first lens unit G1 includes a single positive lens element. In the zoom lenses according to the first embodiment and the second embodiment, the first lens unit G1 includes a lens element L1 having a positive meniscus shape and a convex surface directed to the object side. Also, in the zoom lens according to the third embodiment, the first lens unit G1 includes a single cemented lens element in which, in order from the object side, a lens element L1 having a negative meniscus shape and a convex surface directed to the object side, and a lens element L2 having a positive meniscus shape and a convex surface directed to the object side, are combined together.

In the zoom lenses of the embodiments, the second lens unit G2 includes, in order from an object side, a lens element L2 (L3 in the third embodiment) having a negative meniscus shape and a convex surface directed to the object side, a lens element L3 (L4 in the third embodiment) having a bi-concave shape, and a lens element L4 (L5 in the third embodiment) having a positive meniscus shape and a convex surface directed to the object side.

In the zoom lens of the fkst embodiments, the third lens unit G3 includes, in order from the object side, a lens element L5 (L6 in the third embodiment) having a positive meniscus shape and a convex surface directed to the object side, and a cemented lens element in which a lens element L6 (L7 in the third embodiment) having a bi-convex shape and a lens element L7 (L8 in the third embodiment) having a bi-concave shape, are combined together.

In the zoom lenses of the embodiments, the fourth lens unit G4 includes a single lens element L8 (L9 in the third embodiment) having a bi-convex shape.

As described above, in the zoom lenses according to the first embodiment and the second embodiment, the first lens unit G1 is configured by a single lens element L1 of positive optical power. By employing this configuration, downsizing of the entire lens system is made possible so as not to increase the F-number at the telephoto end.

In the zoom lens according to the third embodiment, the first lens unit G1 is configured by a single cemented lens element. By employing this configuration, it becomes possible to correct chromatic aberration at the telephoto end in addition to achieving the downsizing effects in the first embodiment and the second embodiment.

In the zoom lenses according to the embodiments, the fourth lens unit G4 is configured by a single lens element having a bi-convex shape and positive optical power (L8 and L9). By employing this configuration, it becomes possible to reduce a collapsed size.

The zoom lenses according to the embodiments contain cemented lens elements in the third lens unit G3. Three lenses which constitute the third lens unit G3 in each of the zoom lenses according to the embodiments are high in decentering sensitivity and high in the amount of aberration occurrence at the time of decentering. Therefore, the third lens unit G3 needs centering when constructing the lens unit. In the zoom lenses according to the embodiments, the image-side surface of the positive optical power lens L5 closest to the most object side of the third lens unit G3 has a concave shape, and therefore, when conducting the centering, the centering operation can be easily performed. Moreover, the zoom lenses according to the embodiments contain one cemented lens element in the third lens unit G3 and the decentering sensitivity on cemented surfaces is low, allowing an easy adjustment in constructing the lens unit.

Hereinafter, conditions to be satisfied by the zoom lenses according to the embodiments will be described. Note that a plurality of conditions to be satisfied are defined for the zoom lenses according to the embodiments, and most preferably, the zoom lenses are configured so as to satisfy all of the conditions. However, the zoom lenses can be configured so as to satisfy individual conditions, thereby achieving effects corresponding thereto.

In a zoom lens (hereinafter, referred to as a "configuration A") including, in order from an object side, a first lens unit of positive optical power, a second lens unit of negative optical power, a third lens unit of positive optical power, and a fourth lens unit of positive optical power, in which, when zooming from a wide-angle end to a telephoto end, the first lens unit and the second lens unit move toward an image side so as to trace a convex path, and the third lens unit and the fourth lens unit move monotonously toward the object side, when, in the state of focusing at infinity, the focal length of the entire lens system at the wide-angle end is $f_W$, the focal length of the first lens unit G1 is $f_{G1}$, and a magnification change ratio is Z, the following conditional expression may be satisfied, $$0.1 < f_W/f_{G1} < 0.3 \quad (1)$$

(where Z>4.5).

Conditional expression (1) relates to the focal length of the first lens unit G1. When the upper limit of conditional expression (1) is exceeded, the power of the first lens unit G1 becomes strong, leading to a large diameter of the lens closest to the object side. On the other hand, when the lower limit of conditional expression (1) is not reached, the power of the first lens unit G1 becomes weak, causing the entire lens system to be long and making it difficult to achieve downsizing.

Note that the aforementioned effect can be enhanced even more by further defining the following ranges in the above expression (1).

$$0.1 < f_W/f_{G1} \quad (1)'$$

$$f_W/f_{G1} < 0.2 \quad (1)''$$

In a zoom lens including the configuration A, when, in the state of focusing at infinity, the focal length of the entire lens system at the wide-angle end is $f_W$, the focal length of the fourth lens unit G4 is $f_{G4}$, and a magnification change ratio is Z, the following conditional expression may be satisfied, $$0.25 < f_W/f_{G4} < 0.35 \quad (2)$$

(where Z>4.5).

Conditional expression (2) relates to the focal length of the fourth lens unit G4. When the upper limit of conditional expression (2) is exceeded, the power of the fourth lens unit G4 becomes strong, causing difficulties in compensating for coma aberration and astigmatic aberration. On the other hand, when the lower limit of conditional expression (2) is not reached, the power of the fourth lens unit G4 becomes weak, leading to a large incident angle onto the imaging surface and thereby to degradation in heliocentricity.

Note that the aforementioned effect can be enhanced even more by further defining the following ranges in the above expression (2).

$$0.28 f_W/f_{G4} \quad (2)'$$

$$f_W/f_{G4} < 0.34 \quad (2)''$$

In a zoom lens including the configuration A, when, in the state of focusing at infinity, a magnification change ratio between the wide-angle end and the telephoto end is Z, the thickness of an i-th lens unit (where i is an integer) is $d_i$, and the total thickness of lens units is $d_{si}$, the following conditional expression may be satisfied, $$3 < d_{si}/Z < 5 \quad (3)$$

(where Z>4.5).

The above conditional expression (3) relates to the thickness of each of the lens units. When the upper limit of conditional expression (3) is exceeded, downsizing of the entire lens system becomes difficult and therefore the entire optical length especially at the time of collapse cannot be shortened. On the other hand, when the lower limit of conditional expression (3) is not reached, aberration compensation at all levels of zooming becomes difficult.

Note that the aforementioned effect can be enhanced even more by further defining the following ranges in the above expression (3).

$$3.5 < d_{si}/Z \quad (3)'$$

$$d_{si}/Z < 4.5 \quad (3)''$$

Further, in the zoom lenses according to the embodiments, by moving the third lens unit in a direction perpendicular to an optical axis, it is possible to compensate for image degradation which occurs due to vibrations of the zoom lens caused by a hand shaking movement of a photo-taker or other causes.

When compensating for vibrations by moving the third lens unit in a direction perpendicular to an optical axis in a zoom lens including the aforementioned configuration A as in the zoom lenses according to the embodiments, when, in the state of focusing at infinity, a magnification of the lens in the i-th lens unit (where i is an integer) at the telephoto end is $m_{GiT}$, the following conditional expression may be satisfied, $$1.1 < -(1-m_{G2T})m_{G3T}m_{G4T} < 2.0 \qquad 4).$$

Conditional expression (4) relates to vibration compensation, and, when the upper limit of this conditional expression is exceeded, an amount of decentering in the third lens unit, which is necessary for an image to be decentered by a predetermined amount, becomes extremely small, and thus a precise translation of the third lens unit is difficult. As a result, a displacement of pixels due to vibrations caused by a hand shaking movement during a photo taking or other causes cannot be made small enough, and it is therefore difficult to obtain satisfactory image forming characteristics at the time of vibration compensation. On the other hand, when the lower limit is not reached, the amount of decentering in the third lens unit which is necessary for an image to be decentered by a predetermined amount becomes extremely large, leading to a considerable change in aberration induced by the translation of the third lens unit and hence deteriorating image forming characteristics at a peripheral portion of the image.

Note that, in each embodiment, the image-side surface of a positive optical power lens closest to the object side in the third lens unit G3, namely, the lens L5 in the first and second embodiments, and the lens L6 in the third embodiment, is preferably flat. If the surface is flat, when it is required to perform centering at the time of constructing the lens unit, the centering operation can be easily performed as in the case of a concave surface.

Note that, each lens unit as used in each embodiment is configured by, but not limited to, only refractive type lenses which deflect an incident light ray by refraction (i.e., lenses of a type in which deflection takes place at an interface between media having different refractive indices). Each lens unit may be configured by, for example, diffractive type lenses which deflect an incident light ray by diffraction, refraction/diffraction hybrid type lenses which deflect an incident light ray by a combination of a diffractive action and a refractive action, and refractive index distributed type lenses which deflect an incident light ray by refractive index distribution across a medium.

Further, in each embodiment, by placing a reflective surface in an optical path, the optical path may be bent in the front, back, or middle of the zoom lens system. The bending position may be set according to necessity, and, by appropriate bending the optical path, it becomes possible to achieve a reduction in an appearing thickness of a camera.

Furthermore, each embodiment illustrates a configuration of placing a flat plate including an optical low-pass filter placed between the rearmost surface of the zoom lens system and an imaging element S and types of filters applicable as this low-pass filter include, for example, a birefringent low-pass filter made of crystal or the like having a predetermined adjusted crystal axis direction, and a phase type low-pass filter which obtains required characteristics of an optical cut-off frequency by the effect of diffraction.

Hereinafter, numerical examples implemented by the zoom lenses according to the embodiments are presented. Note that, in each numerical example, all units of length in tables are in millimeters. Also, in tables 1, 4, and 7, r refers to a radius of curvature, d refers to a distance between surfaces, and nd and vd refer to a refractive index and an Abbe number on d-line, respectively. Further, in tables 1, 4, and 7, surfaces assigned with mark "*" are aspherical surfaces, and this aspherical surface shape is defined by the following equation (AS).

$$Z = \frac{h^2/r}{1+\sqrt{1-(1+\kappa)(h/r)^2}} + Dh^4 + Eh^6 + Fh^8 + Gh^{10} \qquad (AS)$$

Here, Z refers to a surface shape when an optical axis is the origin, h refers to a distance from the optical axis, r refers to a radius of curvature, K refers to a conic constant, and D, E, F, and G refer to fourth-, sixth-, eighth-, and tenth-order aspherical coefficients, respectively.

Figure 2:
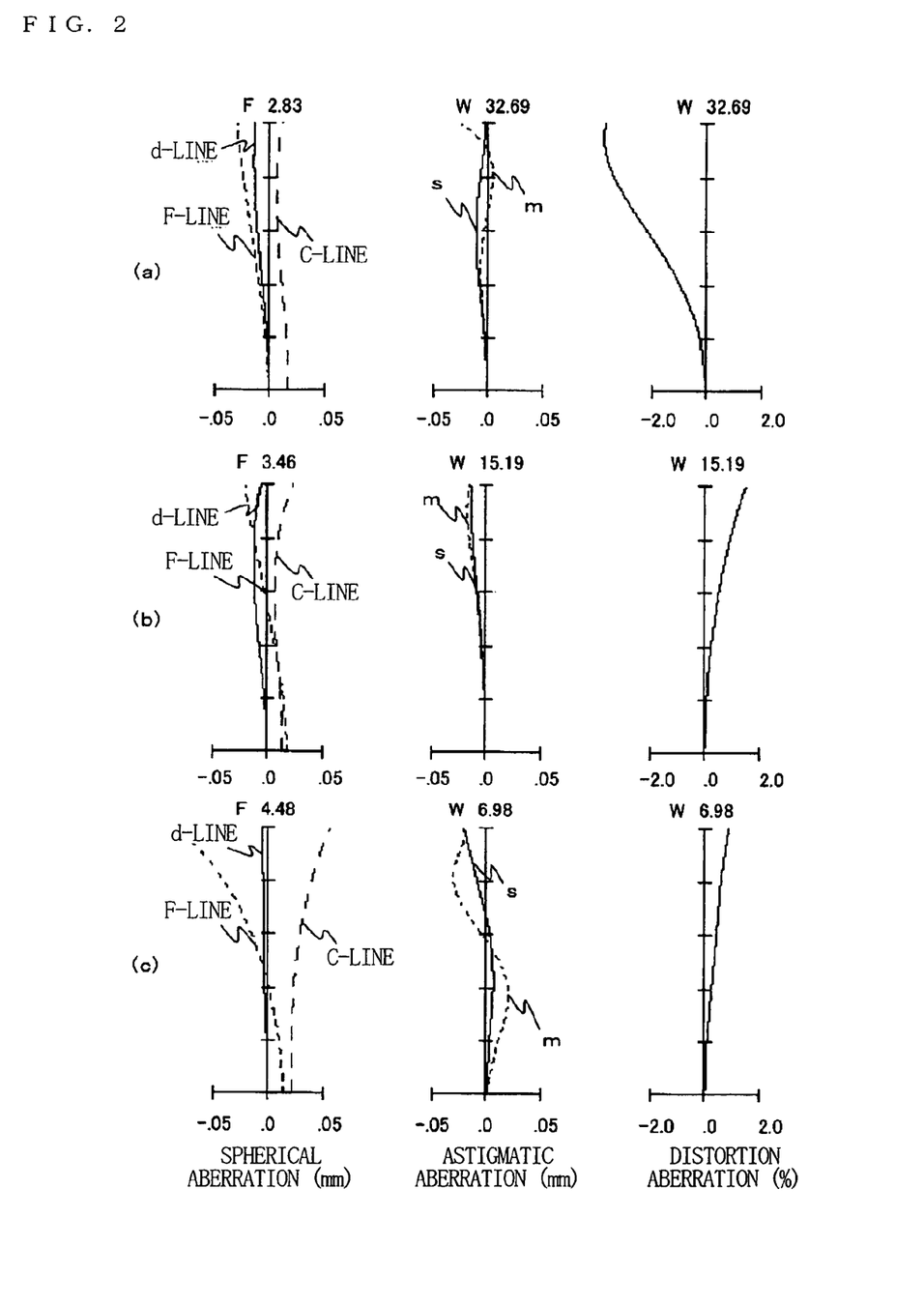
FIG. 2 is a diagram illustrating aberrations of the zoom lens according to the first embodiment of the present invention.
Figure 4:
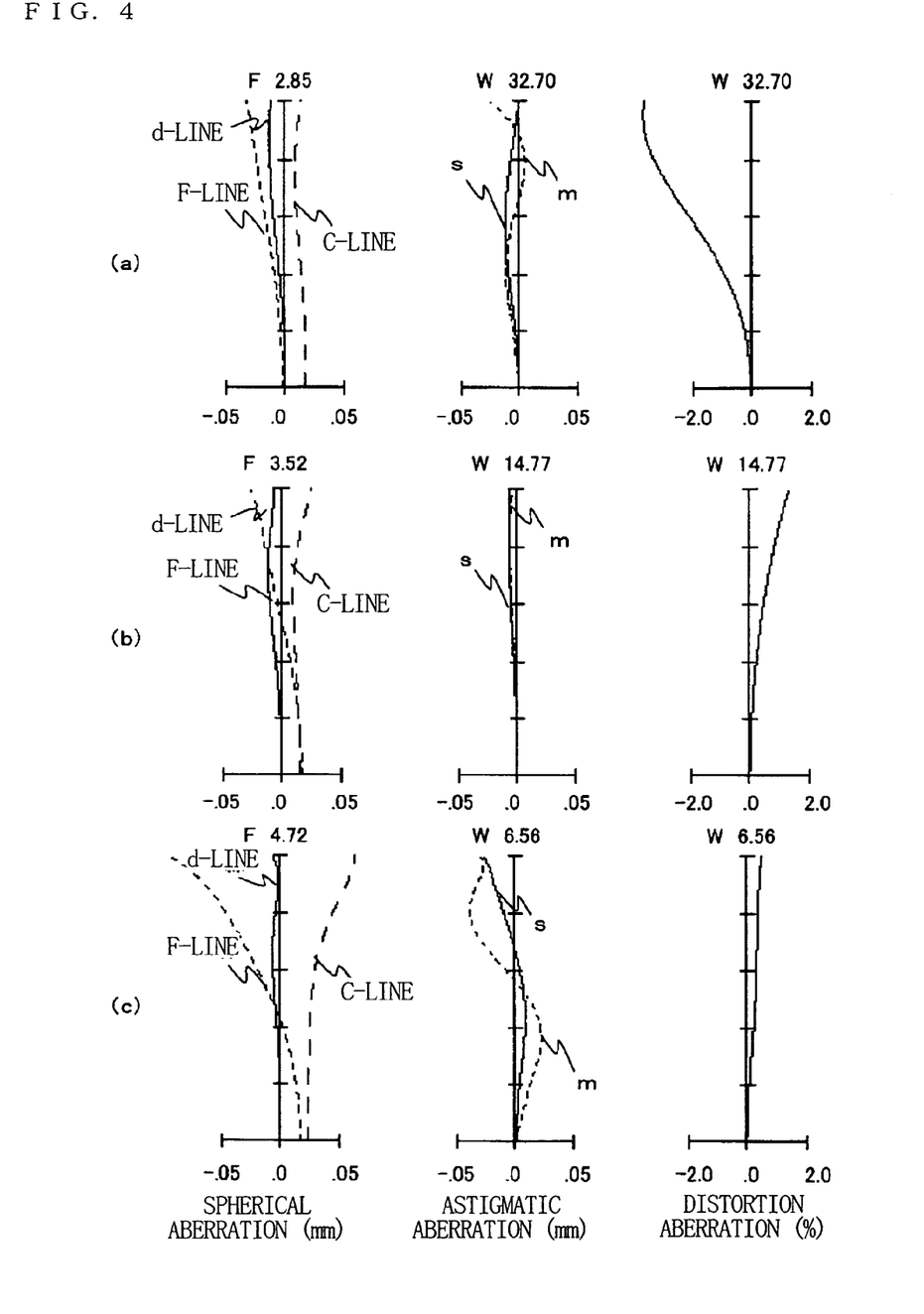
FIG. 4 is a diagram illustrating aberrations of the zoom lens according to the second embodiment of the present invention.
Figure 6:
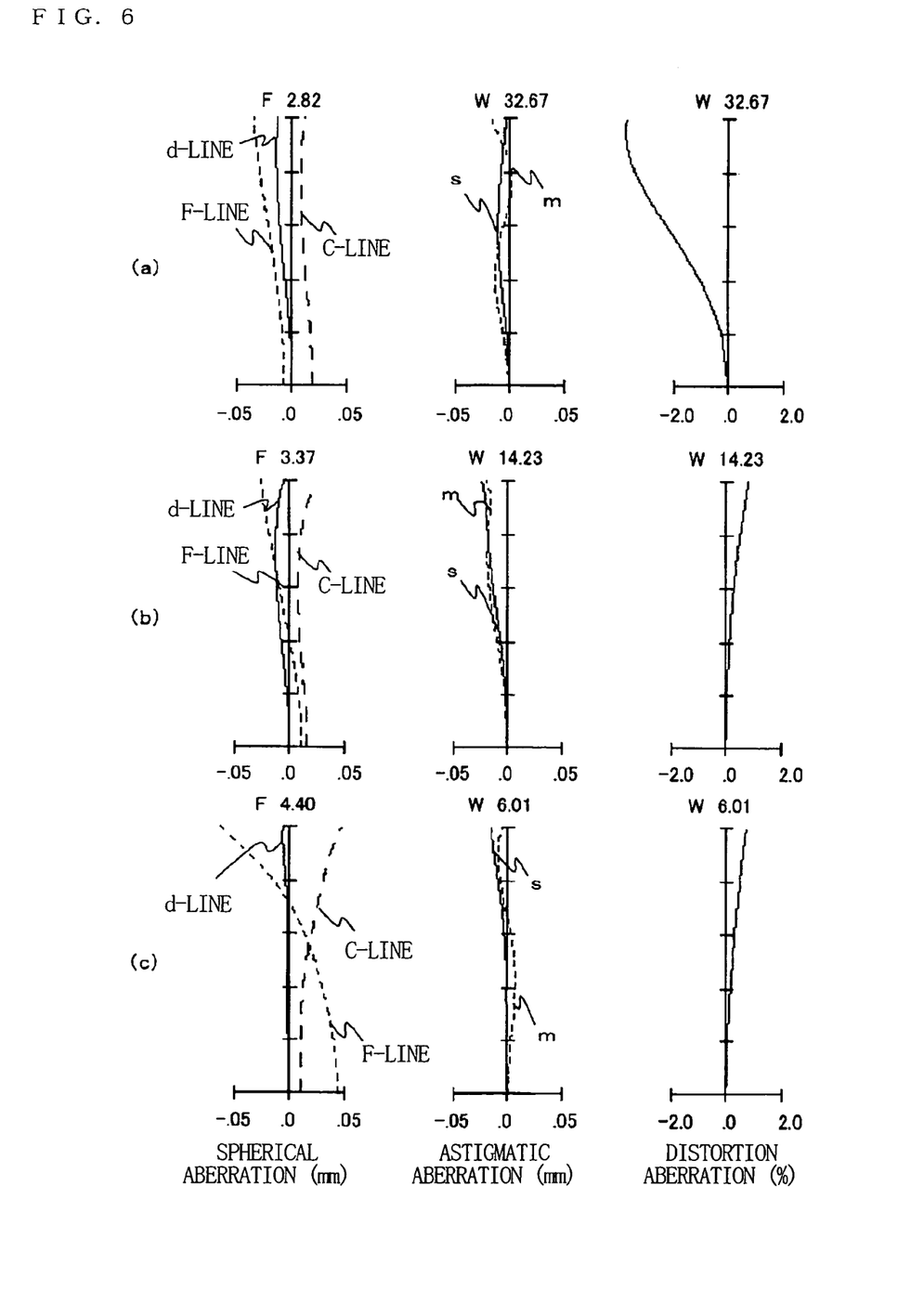
FIG. 6 is a diagram illustrating aberrations of the zoom lens according to the third embodiment of the present invention.

FIG. 2 is a vertical aberration diagram of the zoom lens according to Example 1 of the present invention in the state of focusing at infinity. FIG. 4 is a vertical aberration diagram of the zoom lens according to Example 2 of the present invention in the state of focusing at infinity. FIG. 6 is a vertical aberration diagram of the zoom lens according to Example 3 of the present invention in the state of focusing at infinity.

In each vertical aberration diagram, (a) indicates aberration at a wide-angle end, (b) indicates aberration at an intermediate position, and (c) indicates aberration at a telephoto end. Each aberration diagram shows, in order from the left side, spherical aberration, astigmatic aberration, and distortion aberration. In spherical aberration diagrams, the vertical axis represents F-number, the solid line is a characteristic of d-line, the short dashed line is a characteristic of F-line, and the long dashed line is a characteristic of C-line. In astigmatic aberration diagrams, the vertical axis represents a half of field view, the solid line is a characteristic of a sagittal plane, and the broken line is a characteristic of a meridional plane. In distortion aberration diagrams, the vertical axis represents a half of field view.

Figure 7:
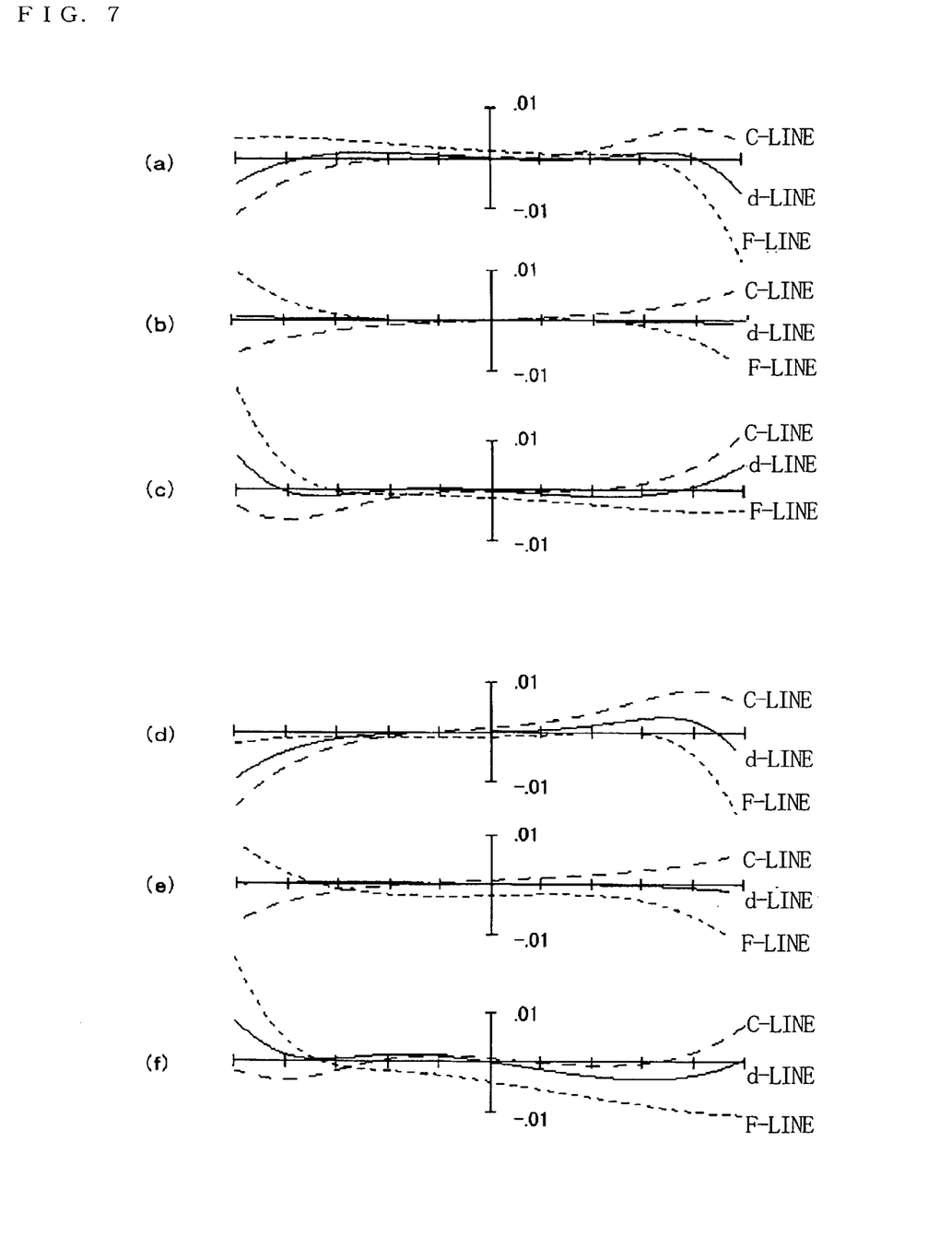
FIG. 7 is a diagram illustrating aberrations of the zoom lens according to the first embodiment of the present invention at a telephoto end in a basic state and aberrations of the zoom lens in a state of vibration compensation.
Figure 8:
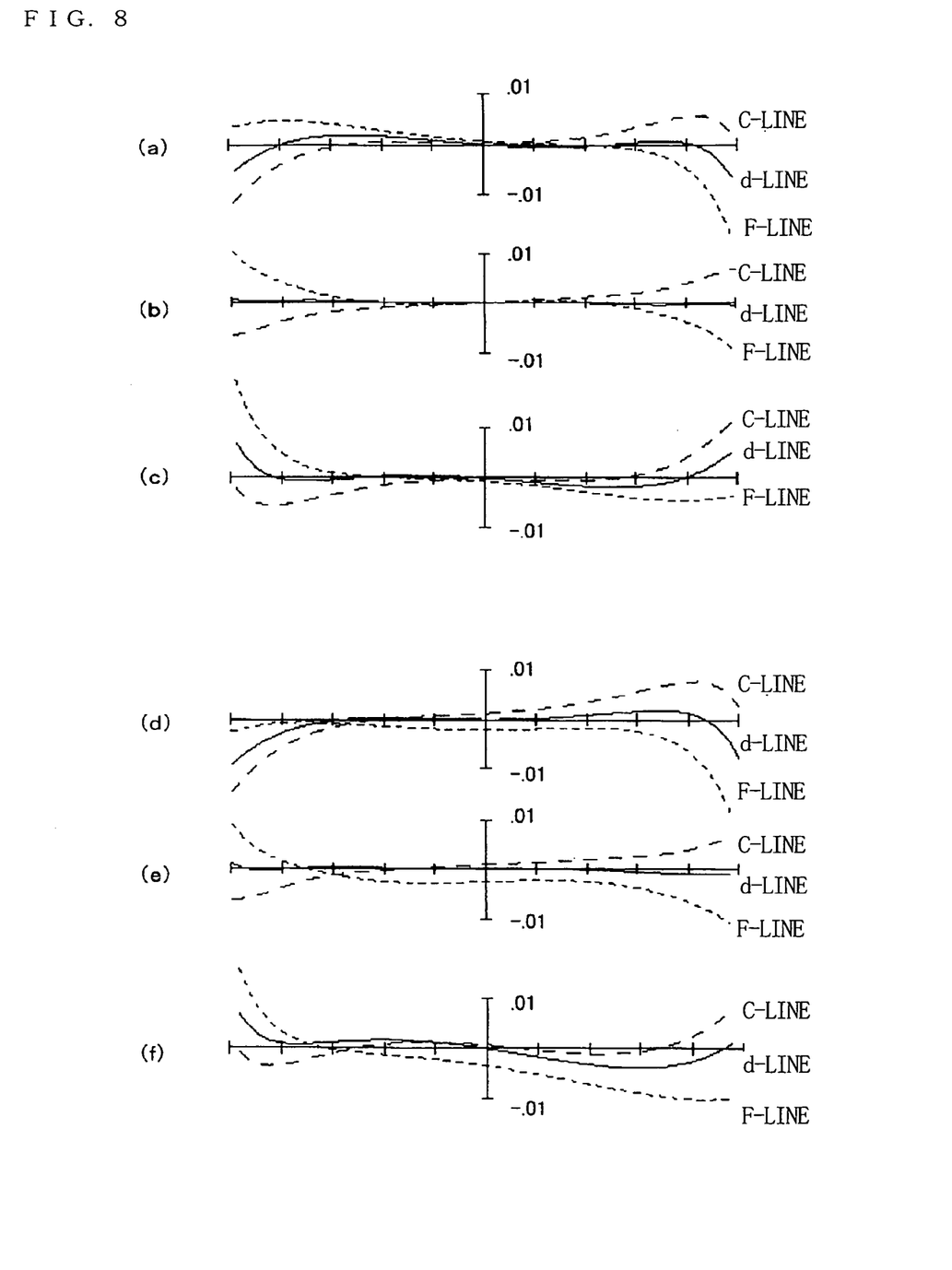
FIG. 8 is a diagram illustrating aberrations of the zoom lens according to the second embodiment of the present invention at a telephoto end in a basic state and aberrations of the zoom lens in a state of vibration compensation.
Figure 9:
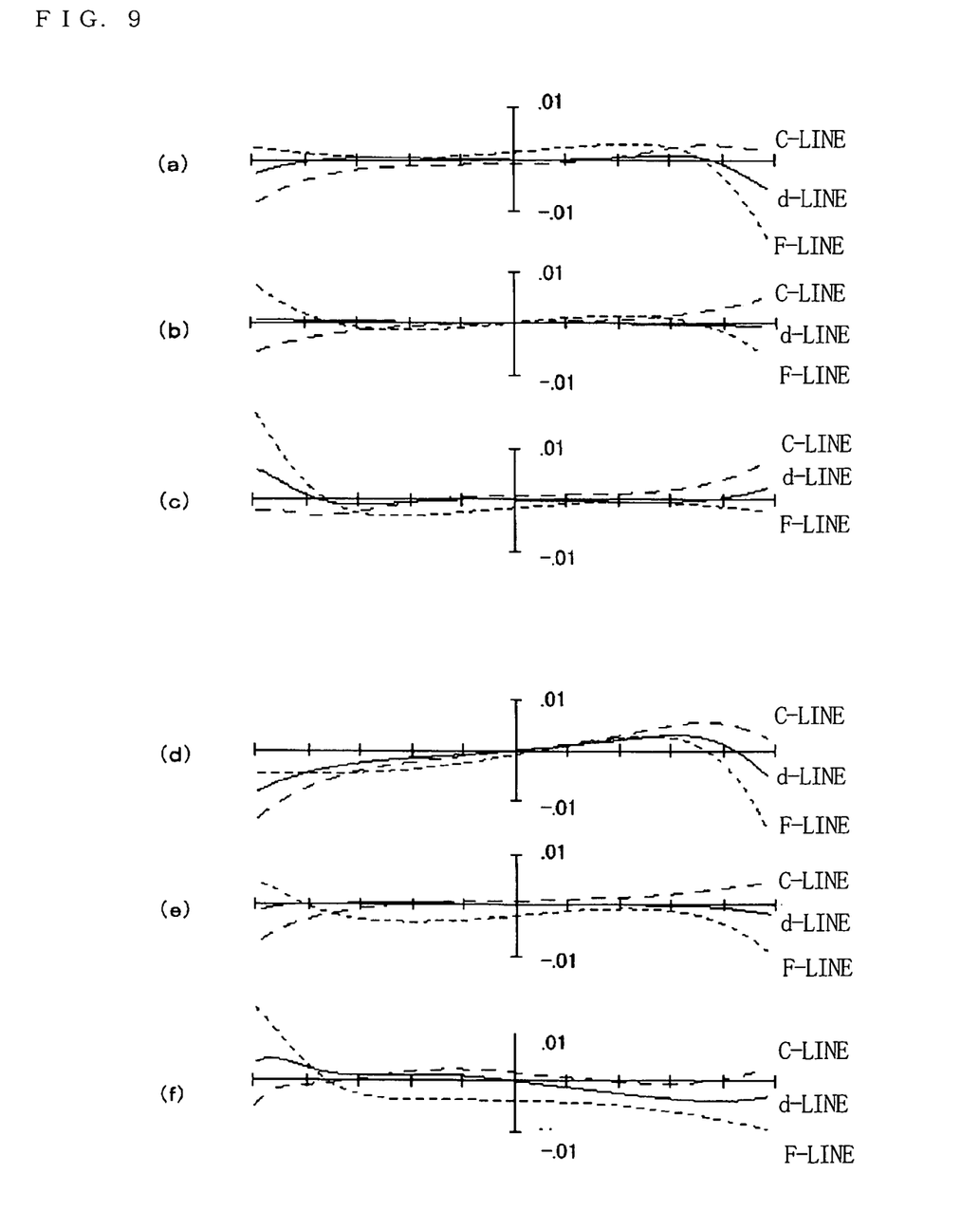
FIG. 9 is a diagram illustrating aberrations of the zoom lens according to the third embodiment of the present invention at a telephoto end in a basic state and aberrations of the zoom lens in a state of vibration compensation.

FIG. 7 is a lateral aberration diagram for comparing cases where the third lens unit of the zoom lens according to Example 1 of the present invention in the state of focusing at infinity is shifted in a direction perpendicular to an optical axis. FIG. 8 is a lateral aberration diagram for comparing cases where the third lens unit of the zoom lens according to Example 2 of the present invention in the state of focusing at infinity is shifted in a direction perpendicular to an optical axis. FIG. 9 is a lateral aberration diagram for comparing cases where the third lens unit of the zoom lens according to Example 3 of the present invention in the state of focusing at infinity is shifted in a direction perpendicular to an optical axis. Note that each lateral aberration diagram indicates lateral aberration at a telephoto end in a full-open condition of diaphragm.

A "basic state" is defined as when an amount of translation of the third lens unit G3 is "0", and a "vibration compensation state" is defined as when the third lens unit G3 being translated. In each lateral aberration diagram, (a), (b), and (c) respectively represent lateral aberrations in the basic state for an image point at 75% of maximum image height (+75% image point), an axial image point, and an image point at −75% of maximum image height (−75% image point). Further, in each lateral aberration diagram, (d), (e), and (f) respectively represent lateral aberrations in the vibration compensation state for the +75% image point, the axial image point, and the −75% image point. In each lateral aberration diagram, the solid line corresponds to a characteristic of d-line, the short dashed line corresponds to a characteristic of F-line, and the long dashed line corresponds to a characteristic of C-line.

EXAMPLE 1

Example 1 corresponds to the above-described first embodiment. Lens data concerning a zoom lens in Example 1 is shown in table 1, aspherical surface data is shown in table 2, and data concerning focal lengths, F-numbers, field views, entire optical lengths, and variable distances between surfaces in the state of focusing at infinity is shown in table 3.

TABLE 1

| Lens Unit | Lens | Surface | r | d | nd | vd |
|---|---|---|---|---|---|---|
| G1 | L1 | 1 | 31.937 | 3.000 | 1.729160 | 54.68 |
|  |  | 2 | 1056.095 | variable |  |  |
| G2 | L2 | 3 | 52.752 | 1.000 | 1.806100 | 33.27 |
|  |  | 4 | 8.041 | 4.500 |  |  |
|  | L3 | 5 | −118.668* | 0.800 | 1.665564 | 54.76 |
|  |  | 6 | 12.368* | 0.658 |  |  |
|  | L4 | 7 | 15.125 | 2.300 | 1.846664 | 23.78 |
|  |  | 8 | 277.268 | variable |  |  |
| diaphragm |  | 9 | ∞ | 0.900 |  |  |
| G3 | L5 | 10 | 7.763 | 1.800 | 1.729160 | 54.68 |
|  |  | 11 | 313.927 | 1.642 |  |  |
|  | L6 | 12 | 10.871* | 1.900 | 1.665564 | 54.76 |
|  | L7 | 13 | −165.351 | 0.700 | 1.846664 | 23.78 |
|  |  | 14 | 6.158 | variable |  |  |
| G4 | L8 | 15 | 14.542* | 2.150 | 1.804313 | 40.87 |
|  |  | 16 | −685.647 | variable |  |  |
|  | P | 17 | ∞ | 2.100 | 1.516798 | 64.20 |
|  |  | 18 | ∞ |  |  |  |

TABLE 2

| Surface | κ | D | E | F | G |
|---|---|---|---|---|---|
| 5 | 0.00000E+00 | −5.38745E−04 | 1.76624E−05 | −3.13459E−07 | 2.17359E−09 |
| 6 | 0.00000E+00 | −6.33175E−04 | 2.01662E−05 | −3.90436E−07 | 2.98778E−09 |
| 12 | 0.00000E+00 | −4.91190E−04 | −1.39572E−05 | 7.33839E−08 | −1.05199E−08 |
| 15 | 0.00000E+00 | −3.48885E−05 | 1.62275E−06 | −6.48592E−08 | 8.94698E−10 |

TABLE 3

| Distance Between Surfaces | Wide-angle End | Intermediate End | Telephoto End |
|---|---|---|---|
| f | 5.80 | 13.00 | 29.01 |
| F | 2.83 | 3.46 | 4.48 |
| 2ω | 65.4 | 30.4 | 14.0 |
| L | 59.817 | 56.857 | 67.252 |
| d2 | 0.800 | 7.733 | 14.685 |
| d8 | 25.375 | 9.832 | 1.500 |
| d14 | 5.336 | 9.091 | 19.414 |
| d16 | 3.750 | 5.650 | 7.097 |

From FIG. 2 showing the aberrations, it is found that various aberrations of the zoom lens shown in the above tables 1, 2, and 3 are well compensated, even in the case where zooming positions are changed.

In the simulation where the zoom lens according to Example 1 is in the vibration compensation state, the third lens unit G3 is translated by 0.114 mm in a direction perpendicular to the optical axis. In this case, the amount of decentering is equivalent to the amount of image decentering in the case where, the zoom lens in the state of focusing at infinity is tilted by 0.3° at a telephoto end.

As being apparent from FIG. 7, it is found that lateral aberration at the axial image point has satisfactory symmetry. In addition, when comparing the lateral aberration at the +75% image point and the lateral aberration at the −75% image point against those in the basic state, it is found that in either case, the degree of curvature is small and aberration curves are substantially equal in slope, and therefore, that decentering coma aberration and decentering astigmatic aberration are small. This indicates that, even in a decentering compensation state, sufficient imaging performance is attained.

When a vibration compensation angle of the zoom lens is invariable, as the focal length of the entire lens system becomes shorter, the amount of translation necessary for vibration compensation decreases. Therefore, at any zooming position, if the vibration compensation angle is 0.3°, sufficient vibration compensation can be performed without degrading imaging characteristics.

EXAMPLE 2

Example 2 corresponds to the above-described second embodiment. Lens data concerning a zoom lens in Example 2 is shown in table 4, and aspherical data is shown in table 5. Additionally, data concerning focal lengths, F-numbers, field views, entire optical lengths, and variable distances between surfaces in the state of focusing at infinity is shown in table 6.

TABLE 4

| Lens Unit | Lens | surface | r | d | nd | vd |
|---|---|---|---|---|---|---|
| G1 | L1 | 1 | 34.278 | 3.000 | 1.729160 | 54.68 |
|  |  | 2 | 754.291 | variable |  |  |
| G2 | L2 | 3 | 46.805 | 1.000 | 1.806100 | 33.27 |
|  |  | 4 | 8.118 | 4.500 |  |  |
|  | L3 | 5 | −55.046* | 0.800 | 1.665564 | 54.76 |
|  |  | 6 | 13.508* | 0.711 |  |  |
|  | L4 | 7 | 15.356 | 2.300 | 1.846664 | 23.78 |
|  |  | 8 | 402.328 | variable |  |  |
| diaphragm |  | 9 | ∞ | 0.900 |  |  |
| G3 | L5 | 10 | 7.736 | 1.800 | 1.729160 | 54.68 |
|  |  | 11 | 386.549 | 1.646 |  |  |
|  | L6 | 12 | 11.044* | 1.900 | 1.665564 | 54.76 |
|  | L7 | 13 | −165.351 | 0.700 | 1.846664 | 23.78 |
|  |  | 14 | 6.144 | variable |  |  |
| G4 | L8 | 15 | 14.506* | 2.150 | 1.804313 | 40.87 |
|  |  | 16 | −685.647 | variable |  |  |
|  | P | 17 | ∞ | 2.100 | 1.516798 | 64.20 |
|  |  | 18 | ∞ |  |  |  |

TABLE 5

| Surface | κ | D | E | F | G |
|---|---|---|---|---|---|
| 5 | 0.00000E+00 | −3.18173E−04 | 9.58115E−06 | −1.23182E−07 | 4.24893E−10 |
| 6 | 0.00000E+00 | −3.88362E−04 | 1.16588E−05 | −1.78053E−07 | 8.85330E−10 |
| 12 | 0.00000E+00 | −5.12135E−04 | −1.12598E−05 | −4.40495E−07 | 2.26134E−08 |
| 15 | 0.00000E+00 | −3.11346E−05 | 1.56086E−06 | −5.83724E−08 | 7.40097E−10 |

TABLE 6

| Distance Between Surfaces | Wide-angle End | Intermediate End | Telephoto End |
|---|---|---|---|
| f | 5.80 | 13.41 | 31.01 |
| F | 2.85 | 3.53 | 4.72 |
| 2ω | 65.4 | 29.5 | 13.1 |
| L | 59.739 | 58.359 | 71.886 |
| d2 | 0.800 | 8.952 | 16.780 |
| d8 | 25.106 | 9.465 | 1.400 |
| d14 | 5.468 | 9.582 | 21.976 |
| d16 | 3.754 | 5.753 | 7.115 |

From FIG. 4 showing the aberrations, it is found that various aberrations of the zoom lens shown in the above tables 4, 5, and 6 are well compensated, even in the case where zooming positions are changed.

In the simulation where the zoom lens according to Example 2 is in the vibration compensation state, the third lens unit G3 is translated by 0.119 mm in a direction perpendicular to the optical axis. In this case, the amount of decentering is equivalent to the amount of image decentering in the case where the zoom lens in the state of focusing at infinity is tilted 0.3° at a telephoto end.

TABLE 7

| Lens Unit | Lens | surface | r | d | nd | vd |
|---|---|---|---|---|---|---|
| G1 | L1a | 1 | 28.843 | 1.000 | 1.846664 | 23.78 |
|  | L1b | 2 | 23.747 | 3.000 | 1.729160 | 54.68 |
|  |  | 3 | 115.594 | variable |  |  |

TABLE 7-continued

| Lens Unit | Lens | surface | r | d | nd | vd |
|---|---|---|---|---|---|---|
| G2 | L2 | 4 | 24.986 | 1.000 | 1.806100 | 33.27 |
|  |  | 5 | 7.950 | 4.500 |  |  |
|  | L3 | 6 | −54.920* | 0.800 | 1.665564 | 54.76 |
|  |  | 7 | 11.465* | 0.792 |  |  |
|  | L4 | 8 | 12.402 | 2.300 | 1.846664 | 23.78 |
|  |  | 9 | 52.581 | variable |  |  |
| diaphragm |  | 10 | ∞ | 0.900 |  |  |
| G3 | L5 | 11 | 7.833 | 1.800 | 1.729160 | 54.68 |
|  |  | 12 | 921.345 | 1.619 |  |  |
|  | L6 | 13 | 10.800* | 1.900 | 1.665564 | 54.76 |
|  | L7 | 14 | −165.351 | 0.700 | 1.846664 | 23.78 |
|  |  | 15 | 6.287 | variable |  |  |
| G4 | L8 | 16 | 15.403* | 2.150 | 1.804313 | 40.87 |
|  |  | 17 | −685.647 | variable |  |  |
| P |  | 18 | ∞ | 2.100 | 1.516798 | 64.20 |
|  |  | 19 | ∞ |  |  |  |

TABLE 8

| Surface | κ | D | E | F | G |
|---|---|---|---|---|---|
| 6 | 0.00000E+00 | −2.18541E−04 | 8.06184E−06 | −1.07897E−07 | 4.65031E−10 |
| 7 | 0.00000E+00 | −2.46203E−04 | 8.93900E−06 | −1.10179E−07 | 2.26746E−10 |
| 13 | 0.00000E+00 | −4.88653E−04 | −1.47325E−05 | 2.24287E−07 | −2.36196E−08 |
| 16 | 0.00000E+00 | −2.55388E−05 | 6.43758E−07 | −2.45517E−08 | 3.43076E−10 |

As being apparent from FIG. 8, it is found that even in the decentering compensation state, the zoom lens in Example 2 can attain satisfactory imaging performance.

EXAMPLE 3

Example 3 corresponds to the above-described third embodiment. Lens data concerning a zoom lens in Example 3 is shown in table 7, and aspherical data is shown in table 8. Further, data concerning focal lengths, F-numbers, field views, entire optical lengths, and variable distances between surfaces in the state of focusing at infinity is shown in table 9.

TABLE 9

| Distance Between Surfaces | Wide-angle End | Intermediate End | Telephoto End |
|---|---|---|---|
| f | 5.80 | 14.02 | 33.82 |
| F | 2.82 | 3.37 | 4.40 |
| 2ω | 65.3 | 28.5 | 12.0 |
| L | 60.932 | 60.263 | 70.990 |
| d3 | 0.800 | 11.566 | 20.455 |
| d9 | 26.017 | 10.078 | 1.400 |
| d15 | 4.709 | 7.095 | 16.361 |
| d17 | 3.738 | 5.861 | 7.118 |

From FIG. 6 showing the aberrations, it is found that various aberrations of the zoom lens according to Example 3 shown in the above table 7, 8, and 9 are well compensated, even in the case where zooming positions are changed.

In the simulation where the zoom lens according to Example 3 being in the vibration compensation state, the third lens unit G3 is translated by 0.131 mm in a direction perpendicular to the optical axis. In this case, the amount of decentering is equivalent to the amount of image decentering in the case where the zoom lens in the state of focusing at infinity is tilted by 0.3° at a telephoto end.

As being apparent from FIG. 9, it is found that even in the decentering compensation state, the zoom lens of Example 3 can attain satisfactory imaging performance.

As for the zoom lens in each example, values for the above-described conditional expressions (1) to (4) are shown in table 10.

TABLE 10

| Conditional Expression | Example | | |
| --- | --- | --- | --- |
|  | 1 | 2 | 3 |
| $f_W/f_{G1}$ | 0.13 | 0.12 | 0.11 |
| $f_W/f_{G4}$ | 0.33 | 0.33 | 0.31 |
| $d_{si}/Z$ | 4.09 | 3.83 | 3.70 |
| $-(1-m_{G2T})m_{G3T}m_{G4T}$ | 1.58 | 1.63 | 1.55 |

As described above, the zoom lenses according to the examples can be configured to have a field view of 65° at a wide-angle end, a magnification change ratio of about five to six times, a high resolution, and a small number of component lenses, and therefore can become compact when not in use.

Moreover, a vibration compensation function can be readily added to the zoom lenses according to the examples.

SEVENTH EMBODIMENT

Figure 10:
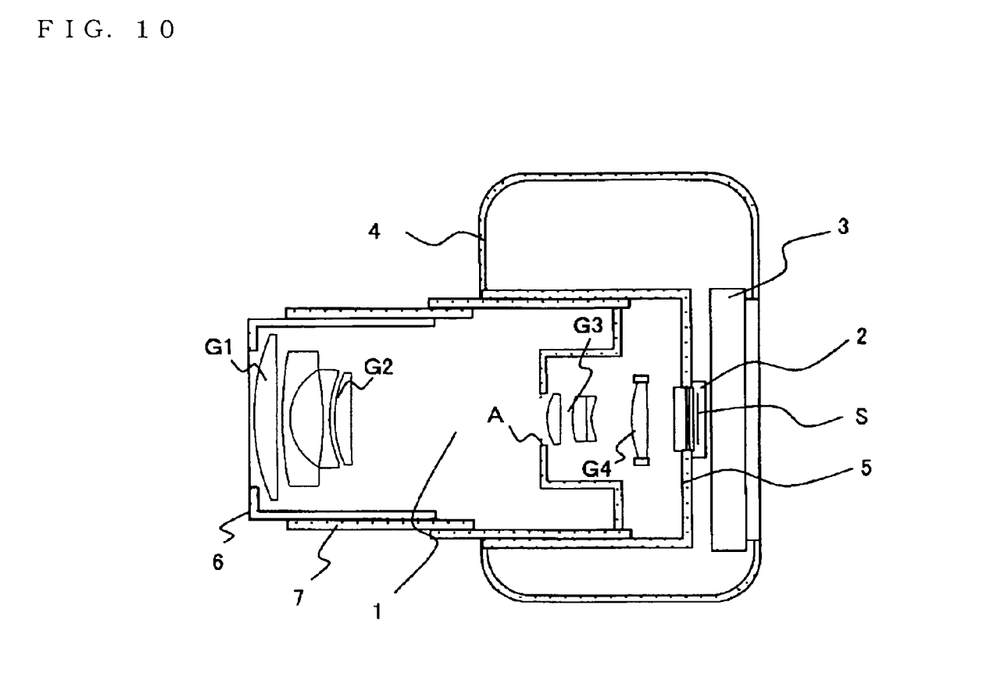
FIG. 10 is a schematic configuration diagram of a digital still camera according to an embodiment of the present invention.
Figure 11:
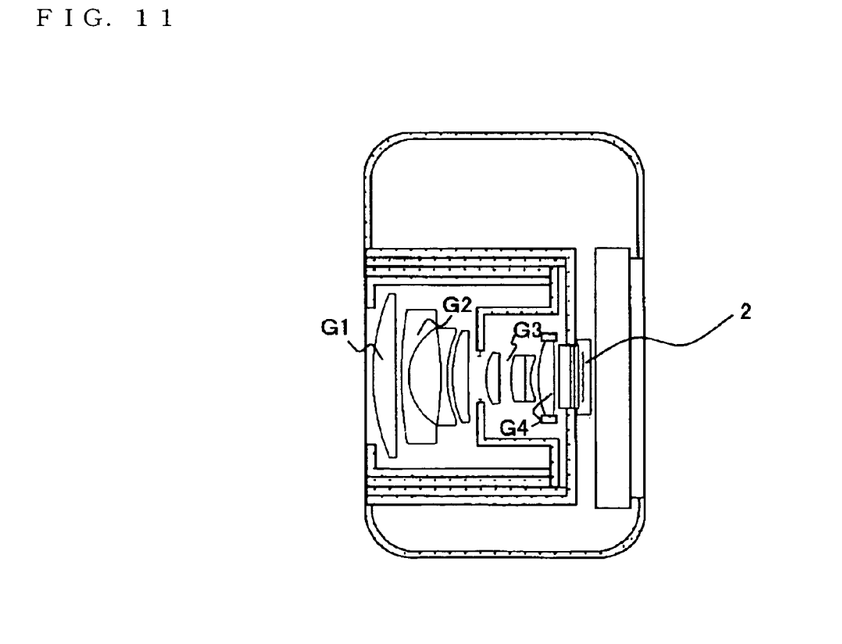
FIG. 11 is a schematic configuration diagram of a digital still camera at the time of collapsing the zoom lens according to an embodiment of the present invention.

FIG. 10 is a schematic configuration diagram of a digital still camera according to a seventh embodiment of the present invention at the time of image capturing, and FIG. 11 is an schematic configuration diagram of the digital still camera when a zoom lens is collapsed.

The digital still camera includes an imaging device including a zoom lens 1 and a solid-state imaging element 2, which is a CCD, a liquid crystal monitor 3, a housing 4, etc. 1 refers to the zoom lens, 2 refers to the solid-state imaging element, and 3 refers to the liquid crystal monitor. For the zoom lens 1, the zoom lens shown in FIG. 1 is employed, G1 is composed of a first lens unit, G2 is composed of a second lens unit, A is composed of a diaphragm, and G3 is composed of a third lens unit. The zoom lens 1 is placed in the front of the housing 4, and the solid-state imaging element 2, which is a CCD, is placed behind the zoom lens 1. The liquid crystal monitor 3 is placed in the rear of the housing 4. An optical image of a subject through the zoom lens 1 is formed on an imaging surface S.

A lens barrel includes a main lens barrel 5, a moving lens barrel 6, and a cylindrical cam 7. When rotating the cylindrical cam 7, the first lens unit G1, the second lens unit G2, and The third lens unit G3 move to a predetermined position relative to a solid-state imaging element 14, making it possible to zoom from a wide-angle end to a telephoto end. The third lens unit G3 is movable in an optical axis direction by a focus adjustment motor.

When not in use, all of the first lens unit G1, the second lens unit G2, the third lens unit G3, and the fourth lens unit G4 are placed to the side of the solid-state imaging element 2, and thus into a collapsed state, thereby making it possible to extremely shorten the entire optical length of the zoom lens when not in use.

Thus, by employing the zoom lens according to the first embodiment, it becomes possible to provide a digital still camera whose magnification change ratio is about three times, field view at the wide-angle end is about 65°, degree of resolution is high, and depth is reduced when not in use.

Note that, for the electronic digital still camera shown in FIG. 10 and FIG. 11, any of the zoom lenses in Examples 2 to 4 may be employed instead of the zoom lens in Example 1. Further, the optical system of the electronic digital still camera shown in FIG. 10 and FIG. 11 can be used for a video camera for use in moving picture applications. In such a case, not only a moving picture, but also a still image of high resolution can be captured.

Furthermore, an imaging device being composed of any zoom lens according to the above-described embodiments and a solid-state imaging element such as a CCD may be applied to a cellular phone apparatus, a PDA (Personal Digital Assistance), a surveillance camera for a surveillance system, a Web camera, and an on-vehicle camera, for example.

As described-above, the zoom lenses according to the embodiments can be configured to have a magnification change ratio of about five to six times, a field view of about 60 to 70° at a wide-angle end, and a high degree of resolution. Further, the zoom lenses according to the embodiments are such that the entire optical length can be shortened when not in use because the number of component lens elements is small. Furthermore, a function of compensating for zoom lens vibrations can be easily added to the zoom lenses according to the embodiments.

Therefore, by employing any of the zoom lenses according to the embodiments, it is possible to provide an optical device, such as a digital still camera, which has a high degree of resolution, a reduced depth dimension when not in use, and a function of compensating for zoom lens vibrations.

INDUSTRIAL APPLICABILITY

A zoom lens according to the present invention is applicable to a digital input device such as a digital still camera, a digital video camera, a cellular phone device, a PDA (Personal Digital Assistance), a surveillance camera for a surveillance system, a Web camera, and an on-vehicle camera, and suitable for an image capturing optical system, in particular, a digital still camera, or a digital video camera, which is required to achieve high image quality.

The invention claimed is:

1. A zoom lens comprising, in order from an object side, a first lens unit of positive optical power, a second lens unit of negative optical power, a third lens unit of positive optical power, and a fourth lens unit of positive optical power, wherein, when zooming from a wide-angle end to a telephoto end, the first lens unit and the second lens unit move so as to trace a convex path toward an image side, and the third lens unit and the fourth lens unit move monotonously toward an object side, and wherein, the third lens unit is moved in a direction perpendicular to an optical axis to allow compensation for a movement of an image caused by a vibration of the zoom lens.

2. The zoom lens according to claim 1 comprising a diaphragm on the object side of the third lens unit.

3. The zoom lens according to claim 1, wherein the first lens unit includes either a single positive lens element or a cemented lens including a set of a negative lens element and a positive lens element.

4. The zoom lens according to claim 1, wherein, when in a state of focusing at infinity, a focal length of an entire lens system at the wide-angle end is $f_W$, a focal length of the first lens unit is $f_{G1}$, and a magnification change ratio between the wide-angle end and the telephoto end is Z, condition (1) is satisfied:

$$0.1 < f_W/f_{G1} < 0.3 \text{ (where } Z > 4.5)$$ (1).

5. The zoom lens according to claim 1, wherein, when in a state of focusing at infinity, a focal length of the entire lens system at the wide-angle end is $f_W$, a focal length of the fourth lens unit is $f_{G4}$, and a magnification change ratio between the wide-angle end and the telephoto end is Z, condition (2) is satisfied:

$$0.25 < f_W/f_{G4} < 0.35 \text{ (where } Z > 4.5)$$ (2).

6. The zoom lens according to claim 1, wherein, when in a state of focusing at infinity, a magnification change ratio between the wide-angle end and the telephoto end is Z, a thickness of an i-th lens unit (where i is an integer) is $d_i$, and a total thickness of the lens units is $d_{si}$, condition (3) is satisfied:

$$3 d_{si}/Z < 5 \text{ (where } Z > 4.5)$$ (3).

7. The zoom lens according to claim 1, wherein a single lens element of positive optical power in the fourth lens unit includes a bi-convex lens.

8. The zoom lens according to claim 1, wherein a lens element closest to the object side in the third lens unit includes a lens of positive optical power, and an image-side surface of the lens is flat or concave.

9. The zoom lens according to claim 1, wherein a cemented lens element is included in the third lens unit.

10. An imaging device capable of converting and outputting an optical image of a subject as an electrical image signal, the imaging device comprising:
    a zoom lens for forming the optical image of the subject so as to be zoomable; and
    an imaging element for converting the optical image of the subject formed by the zoom lens into the electrical signal,
    the zoom lens including, in order from an object side, a first lens unit of positive optical power, a second lens unit of negative optical power, a third lens unit of positive optical power, and a fourth lens unit of positive optical power, wherein
    when zooming from a wide-angle end to a telephoto end, the first lens unit and the second lens unit move so as to trace a convex path toward an image side, and the third lens unit and the fourth lens unit move monotonously toward the object side, and wherein,
    the third lens unit is moved in a direction perpendicular to an optical axis to allow compensation for a movement of an image caused by a vibration of the zoom lens.

11. The imaging device according to claim 10, wherein a diaphragm is provided on the object side of the third lens unit.

12. The imaging device according to claim 10, wherein the first lens unit includes either a single positive lens element or a cemented lens including a set of a negative lens element and a positive lens element.

13. The imaging device according to claim 10, wherein, when in a state of focusing at infinity, a focal length of an entire lens system at the wide-angle end is $f_W$, a focal length of the first lens unit is $f_{G1}$, and a magnification change ratio between the wide-angle end and the telephoto end is Z, condition (1) is satisfied:

$$0.1 < f_W/f_{g1} < 0.3 \text{ (where } Z > 4.5)$$ (1).

14. The imaging device according to claim 10, wherein whe in a state of focusing at infinity, a focal length of the entire lens system at the wide-angle end is $f_w$, a focal length of the fourth lens unit is $f_{G4}$, and a magnification change ratio between the wide-angle end and the telephoto end is Z, condition (2) is satisfied:

$$0.25 < f_W/f_{G4} < 0.35 \text{ (where } Z > 4.5)$$ (2).

15. The imaging device according to claim 10, wherein, when in a state of focusing at infinity, a magnification change ratio between the wide-angle end and the telephoto end is Z, a thickness of an i-th lens unit (where i is an integer) is $d_i$, and a total thickness of the lens units is $d_{si}$, condition (3) is satisfied:

$$3 < d_{si}/Z < 5 \text{ (where } Z > 4.5)$$ (3).

16. The imaging device according to claim 10, wherein a single lens element of positive optical power in the fourth lens unit includes a bi-convex lens.

17. The imaging device according to claim 10, wherein a lens element closest to the object side in the third lens unit includes a lens of positive optical power, and an image-side surface of the lens is flat or concave.

18. The imaging device according to claim 10, wherein a cemented lens element is included in the third lens unit.

19. A camera capable of capturing an image of a subject and outputting the image as an electrical signal, the camera comprising
    an imaging device including a zoom lens for forming an optical image of the subject so as to be zoomable, and an imaging element for converting the optical image of the subject formed by the zoom lens into the electrical signal,
    the zoom lens including, in order from an object side, a first lens unit of positive optical power, a second lens unit of negative optical power, a third lens unit of positive optical power, and a fourth lens unit of positive optical power, wherein
    when zooming from a wide-angle end to a telephoto end, the first lens unit and the second lens unit move so as to trace a convex path toward an image side, and the third lens unit and the fourth lens unit move monotonously toward an object side, and Wherein,
    the third lens unit is moved in a direction perpendicular to an optical axis to allow compensation for a movement of an image caused by a vibration of the zoom lens.

20. The camera according to claim 19 being a digital still camera capable of obtaining a still image of the subject.

21. The camera according to claim 19 being a digital video camera capable of obtaining a moving picture of the subject.

* * * * *